Aug. 14, 1951          G. R. EGO          2,564,567
UNIVERSAL SELF CONTAINED PLOW
Filed Oct. 8, 1945          2 Sheets-Sheet 1
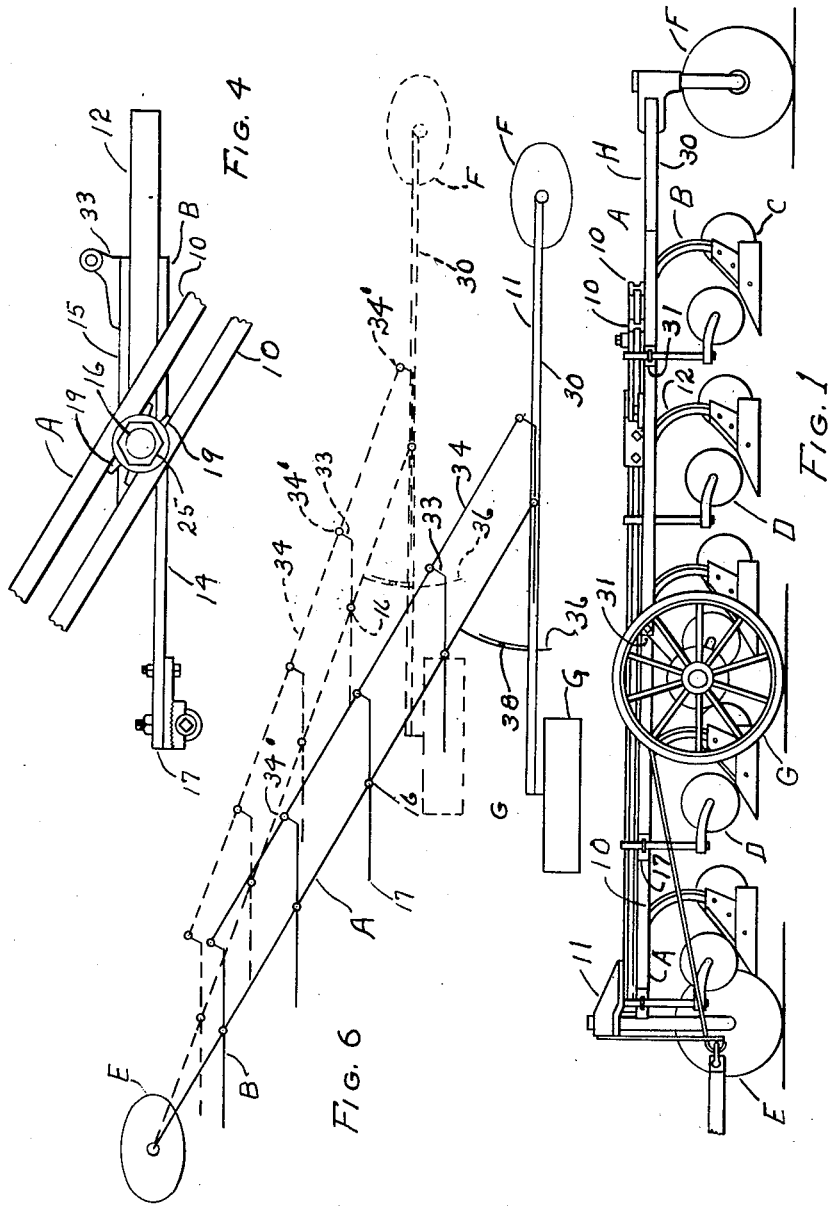
INVENTOR.
GEORGE R. EGO
BY
ATTORNEY Aug. 14, 1951  G. R. EGO  2,564,567
UNIVERSAL SELF CONTAINED PLOW
Filed Oct. 8, 1945  2 Sheets-Sheet 2
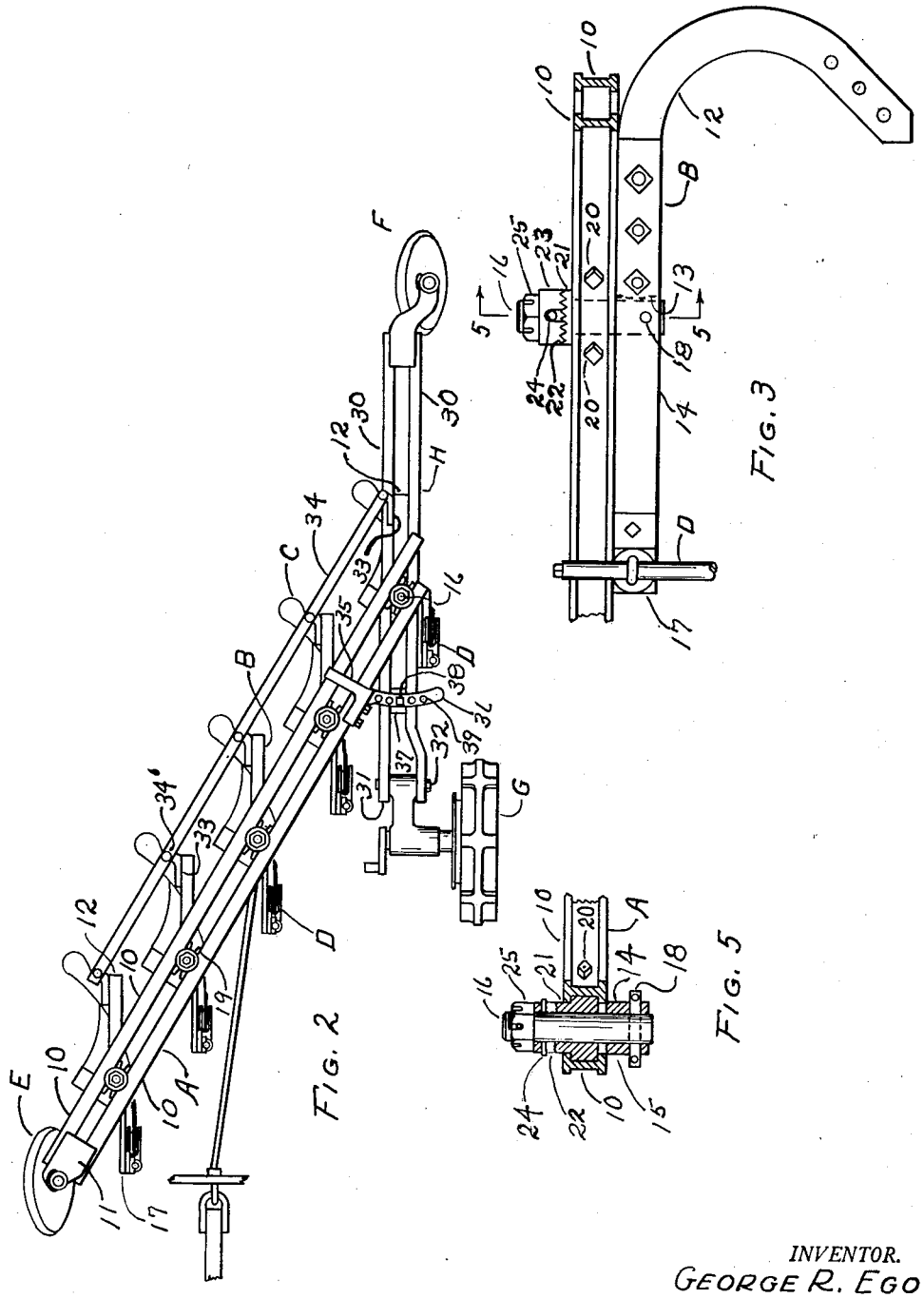
INVENTOR.
GEORGE R. EGO
BY
ATTORNEY Patented Aug. 14, 1951

2,564,567

UNITED STATES PATENT OFFICE 2,564,567

UNIVERSAL SELF-CONTAINED PLOW

George Ross Ego, Brantford, Ontario, Canada, assignor to Massey-Harris Co. Ltd., Toronto, Ontario, Canada, a corporation of Canada Application October 8, 1945, Serial No. 621,098

5 Claims. (Cl. 97—104)

The present invention relates to what is commonly termed a tractor plow, which is carried on three wheels and hitched to the tractor by means of a plow draw bar.

The principal object of the present invention is to provide a plow of the character having means whereby each plow bottom has a frame which is vertically hinged to the main frame and each having a connection to a parallel bar so the plow bottoms may be turned simultaneously on their hinges, the rear plow bottom frame having a forwardly extending member to which the land wheel is attached and having an adjustable connection with the main frame forward of the associate hinge so the angle of the plow bottoms relative to the frame may be easily changed simultaneously and locked into position.

Another object of the present invention is to extend the rearmost plow bottom frame rearwardly and mount the rear furrow wheel on the rear end thereof.

Still another object of the present invention is to provide a forward extension on each plow bottom frame to which its associate rolling colter is attached.

An important object of the present invention is to provide means whereby the main frame may be easily adjusted for different kinds and sizes of bottoms, whereby different sizes and kinds of bottoms or discs may be shipped separately from the plow frames, and attached to the plow bottom frames by the operator and the frame adjusted accordingly.

To these and other useful ends, my invention consists of parts, combinations of parts or their equivalents and mode of operation and adjustments as hereinafter described and claimed and shown in the accompanying drawings in which:

Fig. 1 is a side elevational view of my improved plow having five plow bottoms attached thereto.

Fig. 2 is a top view of the plow illustrated in Figure 1.

Fig. 3 is a side elevational view of a fraction of the main frame illustrating a plow bottom frame attached thereto and the extension to which the rolling colter is attached.

Fig. 4 is an enlarged top view of a fraction of the main frame illustrating the plow frame as shown in Figure 3.

Fig. 5 is a section taken on line 5—5 of Figure 3.

Fig. 6 is a diagrammatic drawing illustrating the plow frames in two positions of adjustment, the narrow position being shown by dotted lines.

As thus illustrated the main frame of my improved plow is in its entirety designated by reference character A. The plow frames in their entireties are designated by reference character B. The plow bottoms in their entireties are designated by reference character C. The colters in their entireties are designated by reference character D.

The front furrow wheel is designated by reference character E. The rear furrow wheel is designated by reference character F, and the land wheel is designated by reference character G.

Member A comprises spaced apart bars 10—10, their front ends being secured to a bracket 11 on which wheel E is mounted. Members B comprise a beam 12 to which members C are secured. This beam terminates as at 13. All but the rear beam have side plates 14 and 15 secured on opposite sides thereof. Member 15 terminates a short distance forward of trunnions 16. Member 14 however, terminates as at 17, its forward end being adapted to carry colters D. Members 14 and 15 are suitably secured to members 16 by means of a bolt 18 or otherwise (see Figure 5). These members lie against the underside of members 10. Brackets 19—19 are adapted to hug opposite sides of trunnions 16 by means of bolts 20—20 (see Figure 3). Members 19 each have an upward projection 21 which is preferably serrated as at 22. A sleeve 23 is slidably keyed to trunnions 16 as at 24. Trunnions 16 are threaded and adapted to receive nuts 25. Thus when nuts 25 are made taut, members 14 and 15 will be held tightly against the bottom surface of members 10 so that when bolts 20 are made taut, members B will be held firmly on member A and in whatever position the plow frames are adjusted in their connection to the rear plow frame. Serrations 22 will assist in holding the plow frames in their adjusted positions.

In the drawings the rear plow frame is designated by reference character H. This rear frame comprises two plates 30—30 on the rear ends of which wheel F is mounted. Members 30—30 are secured to members 10—10 in exactly the same manner as the other plow frames B and as already described.

Members 30—30 extend forward terminating as at 31. Wheel G as is the custom in plows of the character, is hingedly mounted on the forward end of members 30—30 as at 32, whereby this wheel may be moved vertically at this point for depth adjusting and raising and lowering the plow through a suitable lever and crank which is operated by a power lifting clutch (not shown).

It will be noted that the outside member 30 of the plow frame H is adapted to carry its associated rolling colter D. Brackets 33 are secured to frame members B and H, the ends of each of these brackets are pivotally secured to a parallel bar 34 as at 34', thus the plow frames B and H will be held in parallel relation but permitted when desired, to be turned in unison on trunnions 16. I provide substantial means for holding the plow frames in their adjusted position as follows:

A bracket 35 is secured to frame A having an extension 36 which lies preferably over the top of member H (see Figure 2). A bracket 37 is secured to members 30—30 on which member 36 rests. A bolt 38 extends through bracket 37 and through one of a series of holes 39 in extension 36, the holes being on a radius with trunnions 16 on frame H, the holes each being close enough together or being adapted each to represent separate adjustments on the plow frames; or in other words they each represent a different furrow slice width.

Thus it will be seen by removing bolt 38 and loosening the trunnions, all of the plow frames may be turned on their individual trunnions because of parallel bar 34.

Serrations 22 are optional, but when they are used, nut 25 must be loosened enough to permit turning the plow frames.

Thus it will be seen that various sizes and types of plow bottoms or earth working means may be mounted on plow frames B and H and the frame adjusted accordingly in the connection of bracket 35 to bracket 37; that regardless of the adjustment of the plow frames to the main frame, the plows will remain in parallel relation and wheels G and F will remain in a parallel position with the plow frames and direction of travel and that the main frames A and H may be shipped without the plow bottoms or earth engaging means attached and that whatever size earth engaging means or plow bottoms arrive at their destination, the main frame may be adjusted to suit the width of the plow bottoms. Furthermore it will be understood that when the ground is very hard, the frame may be adjusted for cutting narrow furrow slices or for narrow plow bottoms (see Fig. 6) and at other times when the soil is not so hard the frame may be adjusted for cutting wider furrow slices or for wider plow bottoms.

In plows of the character, it is a great advantage to be able to ship certain units in separate bundles of reasonable weight. Applicant's plow main frame may be shipped with or without the plow frames attached. Frames B and H may be shipped separately and it is the expectation that the plow bottoms C or earth engaging means may be shipped separately, thus presenting a very desirable feature for manufacturing, storing and shipping.

A novel feature of applicant's invention is the fact that each plow frame carries its associate rolling colter. Thus once the colters are adjusted in their transverse position, they will remain in the same relative position to the landside edge of the plow.

Clearly minor detail changes may be made in the design shown without departing from the spirit and scope of my invention as recited in the appended claims.

Having thus shown and described my invention, I claim:

1. A plow of the character described comprising in combination, a main frame having a furrow carrying wheel mounted on the front end thereof, a number of spaced plow frames having secured thereto earth engaging means, each said plow frame having a vertical hinge connection to the main frame, the rear plow frame being extended forwardly for a distance with a land wheel mounted on the front end thereof, and having a rearward extension with a rear furrow wheel mounted on the rear end thereof, an adjustable anchor connecting the rear plow frame to the main frame and positioned a distance from the associate hinge for adjusting the angle between the main frame and rear plow frame, a bar spaced a distance from said main frame and parallel thereto and having a connection to each of said plow frames, whereby when said rear plow frame is adjusted to different angles relative to the main frame, the other plow frames will be adjusted simultaneously.

2. A device as recited in claim 1 including, a colter associated with said rear plow frame and being secured to said rear plow frame forward extension, each of said other plow frames having forward extending bars secured thereto and having rolling colters mounted on the forward end thereof, whereby when the colters are once adjusted transversely relative to the plow frames, changing of the angle of the plow frames relative to the main frame will not change the operating position of the colters relative to the plow frames.

3. A plow of the character described comprising in combination, a main frame comprising two spaced apart bars having a furrow carrying wheel mounted on the front end thereof, a number of spaced plow frames, each having an earth engaging means mounted thereon, trunnions secured to the upper side of said plow frames and positioned between said bars, brackets positioned on opposite sides of said trunnion and between the trunnions and bars and having grooves adapted to embrace the trunnions, bolts on opposite sides of the trunnions adapted to bind the trunnions, brackets and bars together, a nut on the protruding end of the trunnions adapted to bind the top of the plow frames to the bottom of said bars, a bar spaced a short distance from said main frame and parallel thereto and having connections to each of said plow frames to cause the plow frames when turned on said trunnions to maintain similar positions relative to the main frame, the rearmost plow frame having forward and rearward extensions with carrying wheels mounted on the ends thereof, an adjusting bracket secured to said main frame and to said rearmost plow frame and positioned a distance from the associated trunnion with means whereby all of the plow frames may be adjusted simultaneously.

4. A device as recited in claim 3 including, rolling colters secured to each said plow frames and positioned a distance forward of said trunnions, whereby adjusting the angle of said plow frames will not change the working position of the colters relative to the plow frames.

5. A plow of the character described comprising: a main frame consisting of two spaced apart bars, a number of plow bottoms each having a plow frame with a vertically arranged trunnion positioned between said bars, brackets positioned on opposite sides of the trunnions having grooves adapted to embrace the trunnions, bolts positioned on opposite sides of the trunnions adapted to bind the trunnions, brackets and main frame bars together, a nut on the protruding end of the trunnions adapted to bind the top of said plow bottom frame to the bottom of said main frame, said plow bottom frames having forwardly extending arms and a colter mounted on the forward end thereof whereby the plow bottom frames may be adjusted relative to said main frame without changing the colter adjustment.

GEORGE ROSS EGO.

REFERENCES CITED

The following references are of record in the file of this patent:

UNITED STATES PATENTS

| Number | Name | Date |
|---|---|---|
| 487,871 | Sommerfeld | Dec. 13, 1892 |
| 732,626 | Fox | June 30, 1903 |
| 818,760 | Haiman | Apr. 24, 1906 |
| 917,762 | Hench | Apr. 13, 1909 |
| 1,635,019 | Walton | July 5, 1927 |
| 1,738,185 | Isaac | Dec. 3, 1929 |
| 1,885,955 | Silver | Nov. 1, 1932 |